(12) United States Patent
Berding et al.

(10) Patent No.: US 8,514,514 B1
(45) Date of Patent: Aug. 20, 2013

(54) DISK DRIVE HAVING AN INNER FRAME WITH A SIDE OPENING AND AN EXTRUDED HERMETICALLY SEALED OUTER ENCLOSURE

(75) Inventors: Keith R. Berding, San Jose, CA (US); Thomas J. Hitchner, San Martin, CA (US); Brian P. Schott, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 103 days.

(21) Appl. No.: 12/969,339

(22) Filed: Dec. 15, 2010

(51) Int. Cl.
*G11B 33/14* (2006.01)

(52) U.S. Cl.
USPC ..................................................... 360/97.01

(58) Field of Classification Search
USPC ..................................................... 360/97.01
See application file for complete search history.

(56) References Cited

U.S. PATENT DOCUMENTS

| | | | |
|---|---|---|---|
| 5,030,260 A | 7/1991 | Beck et al. | |
| 5,041,934 A | 8/1991 | Stefansky | |
| 5,097,978 A | 3/1992 | Eckerd | |
| 5,270,887 A | 12/1993 | Edwards et al. | |
| 5,276,577 A | 1/1994 | Brooks et al. | |
| 5,307,222 A | 4/1994 | Dion | |
| 5,454,157 A | 10/1995 | Ananth et al. | |
| 5,646,801 A | 7/1997 | Boigenzahn et al. | |
| 5,754,365 A | 5/1998 | Beck et al. | |
| 5,877,915 A | 3/1999 | Ishida | |
| 6,088,190 A | 7/2000 | Anderson | |
| 6,128,159 A * | 10/2000 | Ino | 360/97.16 |
| 6,185,807 B1 | 2/2001 | Kazmierczak et al. | |
| 6,266,207 B1 | 7/2001 | Iwahara et al. | |
| 6,285,524 B1 | 9/2001 | Boigenzahn et al. | |
| 6,347,021 B2 | 2/2002 | Kazmierczak et al. | |
| 6,392,838 B1 * | 5/2002 | Hearn et al. | 360/99.18 |
| 6,430,000 B1 * | 8/2002 | Rent | 360/99.25 |
| 6,525,899 B2 | 2/2003 | Hearn et al. | |
| 6,556,372 B2 | 4/2003 | Hearn et al. | |
| 6,618,221 B2 | 9/2003 | Gillis et al. | |
| 6,631,049 B2 | 10/2003 | Satoh et al. | |
| 6,644,362 B2 | 11/2003 | Bernett | |
| 6,646,821 B2 | 11/2003 | Bernett et al. | |
| 6,683,747 B2 | 1/2004 | Bernett | |
| 6,721,128 B1 | 4/2004 | Koizumi et al. | |
| 6,785,082 B2 | 8/2004 | Fiorvanti et al. | |
| 6,785,089 B2 | 8/2004 | Bernett et al. | |
| 6,819,517 B2 | 11/2004 | Fioravanti et al. | |
| 6,822,823 B1 | 11/2004 | Tsuwako et al. | |
| 6,898,043 B2 | 5/2005 | Fioravanti | |
| 6,903,898 B2 | 6/2005 | Nonaka et al. | |
| 6,914,742 B1 | 7/2005 | Fioravanti et al. | |
| 6,970,322 B2 | 11/2005 | Bernett | |
| 6,972,927 B2 | 12/2005 | Hong et al. | |

(Continued)

*Primary Examiner* — Mark Blouin (57) ABSTRACT

A disk drive includes an inner frame that has a disk drive base and a disk drive cover. A disk, mounted on a rotary spindle attached to the disk drive base, defines a disk outer periphery that protrudes into a first side opening of the inner frame. A head actuator is attached to the disk drive base and to the disk drive cover. An outer enclosure includes an extruded hollow cylinder with a cross-sectional shape that is a continuous and unbroken ring that is substantially rectangular, and that surrounds a cavity. The outer enclosure surrounds the disk drive base and the disk drive cover. During assembly, the inner frame may be slid lengthwise into an open end of the outer enclosure, and the outer enclosure may be hermetically sealed to enclose air or helium in the cavity.

19 Claims, 5 Drawing Sheets

(56) References Cited

U.S. PATENT DOCUMENTS

| | | |
|---|---|---|
| 6,989,493 B2 | 1/2006 | Hipwell, Jr. et al. |
| 6,999,262 B2 | 2/2006 | Han et al. |
| 7,016,145 B2 | 3/2006 | Gunderson et al. |
| 7,019,942 B2 | 3/2006 | Gunderson et al. |
| 7,064,920 B2 | 6/2006 | Fujiwara et al. |
| 7,123,440 B2 * | 10/2006 | Albrecht et al. ............ 360/99.18 |
| 7,199,963 B2 | 4/2007 | Fukushima |
| 7,271,974 B2 | 9/2007 | Fukuyama et al. |
| 7,274,534 B1 | 9/2007 | Choy et al. |
| 7,355,811 B1 | 4/2008 | Gifford et al. |
| 7,362,540 B2 * | 4/2008 | Repphun et al. ............ 360/97.18 |
| 7,365,937 B2 | 4/2008 | Gunderson |
| 7,398,590 B1 | 7/2008 | Mann et al. |
| 7,408,737 B2 | 8/2008 | Fukushima et al. |
| 7,434,987 B1 | 10/2008 | Gustafson et al. |
| 7,522,375 B2 | 4/2009 | Tsuda et al. |
| 7,599,147 B2 | 10/2009 | Gunderson |
| 2001/0044023 A1 | 11/2001 | Johnson et al. |
| 2003/0089417 A1 | 5/2003 | Bernett |
| 2003/0179489 A1 | 9/2003 | Bernett et al. |
| 2005/0057849 A1 * | 3/2005 | Twogood et al. ............ 360/97.02 |
| 2005/0068666 A1 | 3/2005 | Albrecht et al. |
| 2005/0092178 A1 | 5/2005 | Lim et al. |
| 2005/0184463 A1 | 8/2005 | Boutaghou et al. |
| 2005/0253343 A1 | 11/2005 | Hampton |
| 2006/0034010 A1 | 2/2006 | Abe et al. |
| 2006/0044675 A1 | 3/2006 | Fukushima et al. |
| 2007/0183085 A1 | 8/2007 | Hatchett et al. |
| 2007/0263319 A1 | 11/2007 | Calderon et al. |
| 2008/0007866 A1 | 1/2008 | Hayakawa et al. |
| 2008/0068745 A1 | 3/2008 | Uefune et al. |
| 2008/0165448 A1 | 7/2008 | Ichikawa et al. |
| 2008/0165449 A1 | 7/2008 | Shindo et al. |
| 2008/0212237 A1 | 9/2008 | Uefune et al. |
| 2008/0310048 A1 | 12/2008 | Hirono et al. |
| 2009/0097163 A1 | 4/2009 | Suzuki et al. |
| 2009/0102131 A1 | 4/2009 | Gunderson |
| 2009/0168233 A1 | 7/2009 | Kouno et al. |
| 2009/0241322 A1 | 10/2009 | Uefune et al. |

* cited by examiner

DISK DRIVE HAVING AN INNER FRAME WITH A SIDE OPENING AND AN EXTRUDED HERMETICALLY SEALED OUTER ENCLOSURE

BACKGROUND

The typical hard disk drive includes a head disk assembly (HDA) and a printed circuit board assembly (PCBA) attached to a disk drive base of the HDA. The HDA includes a disk drive base that, together with a disk drive cover, enclose at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes a head actuator, at least one head gimbal assembly (HGA), and a flex cable assembly. During operation of the disk drive, the head actuator must rotate to position the HGAs adjacent desired information tracks on the disk. The head actuator includes a pivot-bearing cartridge to facilitate such rotational positioning. The pivot-bearing cartridge fits into a bore in the body of the head actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading or writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing." The term "air bearing" is common because typically the lubricant gas is simply air.

However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities. Even where the disk drive enclosure contains only helium, or only nitrogen, or much more helium than air, the gas lubrication film between the head and the disk may still be referred to as an "air bearing" for convenience, and the surface of the head facing that film may still be referred to as an "air bearing surface" for convenience.

Disk drive enclosures disclosed in the art to contain helium are typically hermetically sealed to prevent an unacceptable rate of helium leakage. Although some negligible amount of helium leakage is unavoidable, helium leakage is undesirable because it can alter the thickness of the gas lubrication film between the head and the disk, and thereby affect the performance of the head. Helium leakage is also undesirable because it can alter the tribochemistry of the head disk interface, possibly leading to degradation in reliability, head crashes, and associated data loss.

Various methods and structures that have been disclosed in the past to hermetically seal disk drive enclosures have been too costly, have required too much change to existing disk drive manufacturing processes, and/or were not able to retain helium internal to the disk drive enclosure for sufficient time to ensure adequate product reliability. Thus, there is a need in the art for disk drive enclosure sealing methods and structures that may be practically implemented and integrated in a high volume and low cost disk drive manufacturing process, and that can reduce helium leakage rates enough to retain helium internal to a disk drive enclosure for a sufficient period of time to ensure adequate post-manufacture product reliability and lifetime.

DESCRIPTION OF THE EXAMPLE EMBODIMENTS

Figure 1:
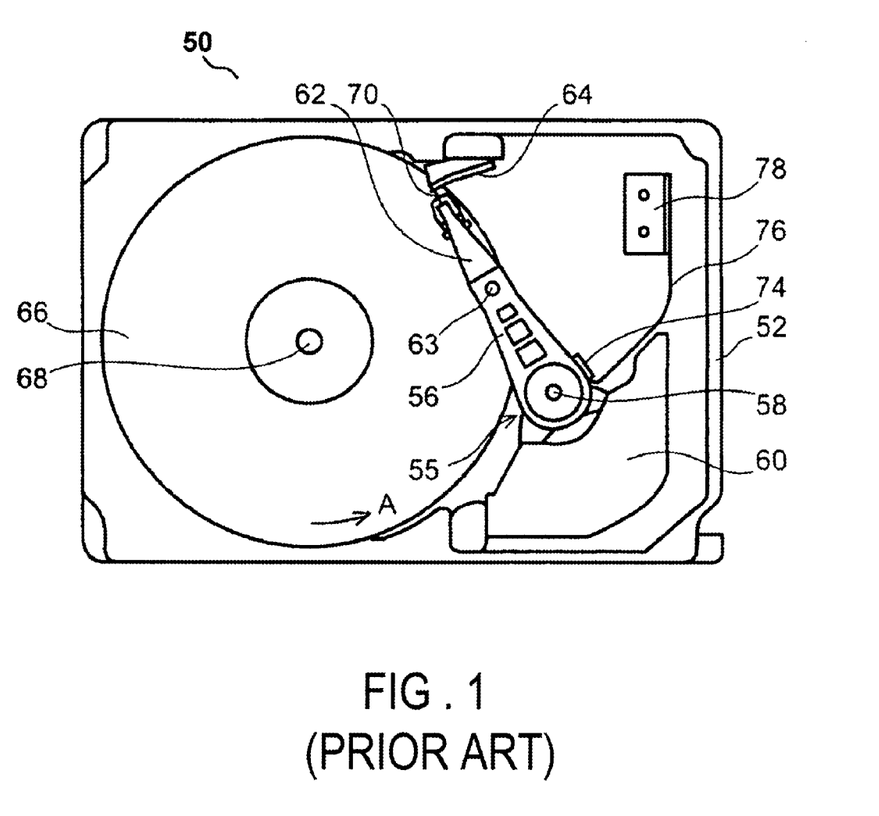
FIG. 1 depicts a conventional disk drive head disk assembly, with the disk drive cover removed from the disk drive base in order to view components internal to the disk drive enclosure.

FIG. 1 depicts a conventional disk drive 50, with the disk drive cover removed from the disk drive base 52 in order to view head disk assembly (HDA) components that are internal to the enclosure of the disk drive 50. For example, a disk 66 is mounted to a spindle 68 that is attached to the disk drive base 52. A head (not visible in FIG. 1) that can read or write information on a surface of the disk 66, is attached to head gimbal assembly (HGA) 62. HGA 62 is attached by swaging connection 63 to an arm 56 of head actuator 55. The HGA 62 can be loaded or unloaded towards or away from a surface of the disk 66 by a load/unload ramp 64. Head actuator 55 includes a pivot-bearing cartridge 58 to facilitate rotation to change the radial position of the HGA 62, relative to the spindle 68 or the load/unload ramp 64. The head actuator 55 responds to control inputs communicated via flexible printed circuit (FPC) 76 to a coil that interacts with permanent magnets of voice coil motor (VCM) 60. The FPC 76 also carries read or write signals to/from the HGA 62 via pre-amplifier 74 and a connector at flex cable bracket 78. Note that in the conventional disk drive 50, the disk drive base 52, and the disk drive cover that is attached to the disk drive base 52 after assembly, together form the only sealed enclosure around the disk 66 and HGA 62. Structures external to that enclosure (e.g. a host computer enclosure) are not sealed, and may be intentionally ventilated to enhance cooling.

Figure 2:
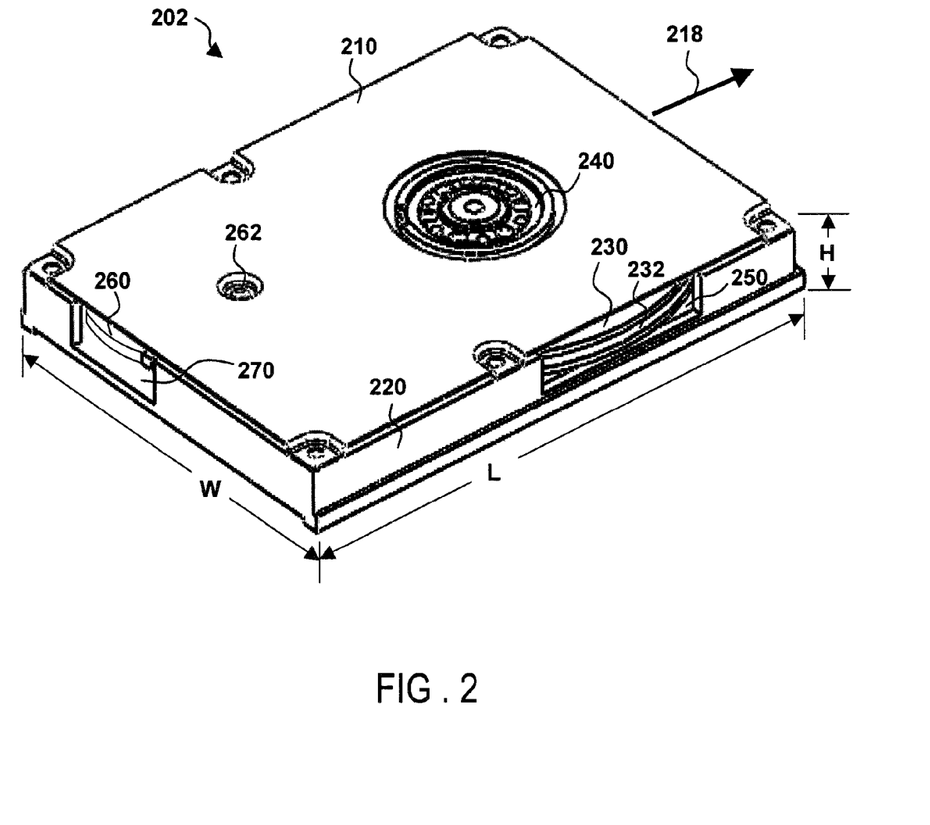
FIG. 2 is a perspective view of a disk drive inner frame, including a disk drive cover and a disk drive base, according to an embodiment of the present invention.

FIG. 2 is a perspective view of a disk drive inner frame 202 that includes a disk drive cover 210 and a disk drive base 220, according to an embodiment of the present invention. The disk drive cover 210 and the disk drive base 220 may comprise aluminum, stainless steel, cast iron, or plastic, for example. The inner frame 202 defines an inner frame height H that is less than an inner frame width W. The inner frame width W is less than an inner frame length L. The lengthwise direction 218 is defined to be parallel with the length L (the longest side) of the inner frame 202.

In the embodiment of FIG. 2, disks 230 and 232 are mounted on a rotary spindle 240 that is attached to the disk drive base 220. Optionally, the rotary spindle 240 may be attached to both the disk drive base 220 and to the disk drive cover 210. Such attachment to both the disk drive base 220 and to the disk drive cover 210 may advantageously provide additional rigidity and precision to the rotary spindle 240. The outer peripheries of the disks 230 and 232 may protrude into a first side opening 250 of the inner frame 202, for example to reduce the dimensions of the inner frame 202. Likewise, the outer peripheries of the disks 230 and 232 may optionally protrude into a second side opening (opposite the first side opening 250) of the inner frame 202, also to reduce the dimensions of the inner frame 202. For example, without such side openings, reduction of the dimensions of the inner frame 202 may be limited, because the diameter of the disks 230 and 232 preferably matches a fixed industry standard form factor (e.g. 95 mm, 65 mm, 48 mm, 27 mm).

In the embodiment of FIG. 2, a head actuator 260 is attached to the disk drive base 220 and to the disk drive cover 210, for example by screw 262. Such attachment to both the disk drive base 220 and to the disk drive cover 210 may advantageously provide additional rigidity and control to the head actuator 260. Optionally, the head actuator 260 may protrude into a first end opening 270 of the inner frame 202, for example to reduce the dimensions of the inner frame 202.

Figure 3A:
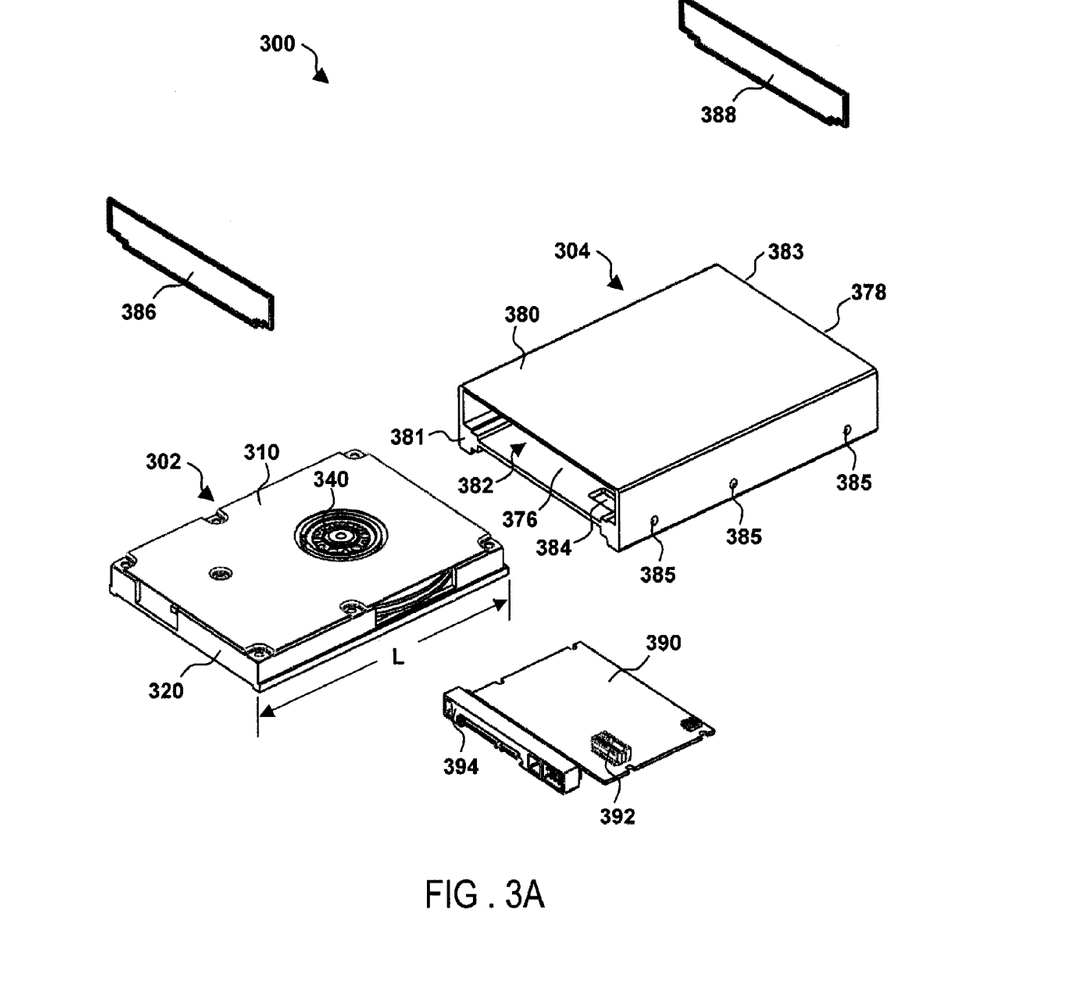
FIG. 3A is an exploded perspective view of a disk drive according to an embodiment of the present invention.

FIG. 3A is an exploded perspective view of a disk drive 300 according to an embodiment of the present invention. The disk drive 300 includes a disk drive inner frame 302 that includes a disk drive cover 310, and a disk drive base 320 to which the disk drive cover is attached. A rotary spindle 340 is attached to the disk drive base 320, and a head actuator (like head actuator 260 of FIG. 2) may be attached to both the disk drive base 320 and the disk drive cover 310. The disk drive cover 310 and the disk drive base 320 may comprise aluminum, stainless steel, cast iron, or plastic, for example.

The disk drive 300 also comprises an outer enclosure 304 that includes an extruded hollow cylinder 380 that is a single monolithic component having material continuity rather than being an assembly of sub-components. Note that one of ordinary skill can identify when a hollow cylinder is "extruded" by physical characteristics, even without any prior knowledge of the manufacturing method used to create the hollow cylinder. An example tell-tale sign is no longitudinal seams. Hence, the term "extruded" as applied herein to the extruded hollow cylinder 380, is used as a structural characteristic, not as a mere process limitation. The extruded hollow cylinder 380 may comprise aluminum, stainless steel, or plastic, for example.

As can be seen at the end of the extruded hollow cylinder 380 shown in FIG. 3A, the extruded hollow cylinder 380 has a cross-sectional shape that is a continuous and unbroken ring that is substantially rectangular. Note that the cross-sectional shape of the extruded hollow cylinder 380 is considered to be substantially rectangular even though it includes features such as protruding side rails that cause the cross-sectional shape to not be perfectly rectangular. Note also that the terms "cylinder" and "ring" as used herein do not imply a circular shape. For example, the cross-sectional shape of the extruded hollow cylinder 380 shown in FIG. 3A is closer to being rectangular than circular.

The extruded hollow cylinder 380 surrounds a cavity 382, into which the disk drive inner frame 302 may fit. The cavity 382 of the outer enclosure 380 may be helium-filled (i.e. may include a substantial concentration of helium gas). Practically, the concentration of enclosed helium gas (e.g. versus remaining air) is likely to be less than 100% initially, and is expected to drop over the useful life of the disk drive 300. Still, the disk drive 300 may be considered to be helium-filled throughout its useful life so long as the cavity 382 of the outer enclosure 380 continues to enclose a substantial concentration of helium gas. Note also that 1.0 atmosphere pressure of helium is not required for the cavity 382 of the outer enclosure 380 to be considered helium-filled. For example, the cavity 382 may initially enclose helium having between 0.3 to 1.0 atmosphere partial pressure, and may also initially enclose air having between 0 to 0.7 atmosphere partial pressure. In certain applications, it may be desirable for at least 70% of the helium gas that is initially enclosed to remain enclosed after a 10 year useful life of the disk drive 300.

In the embodiment of FIG. 3A, the outer enclosure 304 may optionally further comprise a first outer end cap 386 that can be attached to and be hermetically sealed to a first end 381 of the extruded hollow cylinder 380. Likewise, the outer enclosure 304 may optionally further comprise a second outer end cap 388 that can be attached to and be hermetically sealed to a second end 383 of the extruded hollow cylinder 380.

The disk drive 300 may further comprise a disk drive printed circuit board 390 mounted on an outside surface (bottom surface as viewed in FIG. 3A) of the outer enclosure 304. In the embodiment of FIG. 3A, the disk drive printed circuit board 390 may include an electrical connector 392 that can pass through an opening 384 in the outer enclosure 304, and a host bus connector 394. During assembly of the disk drive 300, the electrical connector 392 may be hermetically sealed with the extruded hollow cylinder 380 around the periphery of the opening 384, to reduce leakage of enclosed gas from the cavity 382 via the opening 384. Also in the embodiment of FIG. 3A, the outer enclosure 304 may include a plurality of blind threaded holes 385 for mounting the disk drive 300 into a host personal computer system. The threaded holes 385 may be referred to as "blind" if they do not extend all the way to the cavity 382 in the extruded hollow cylinder 380, and therefore do not provide a passage for enclosed gas to escape the cavity 382.

Figure 3B:
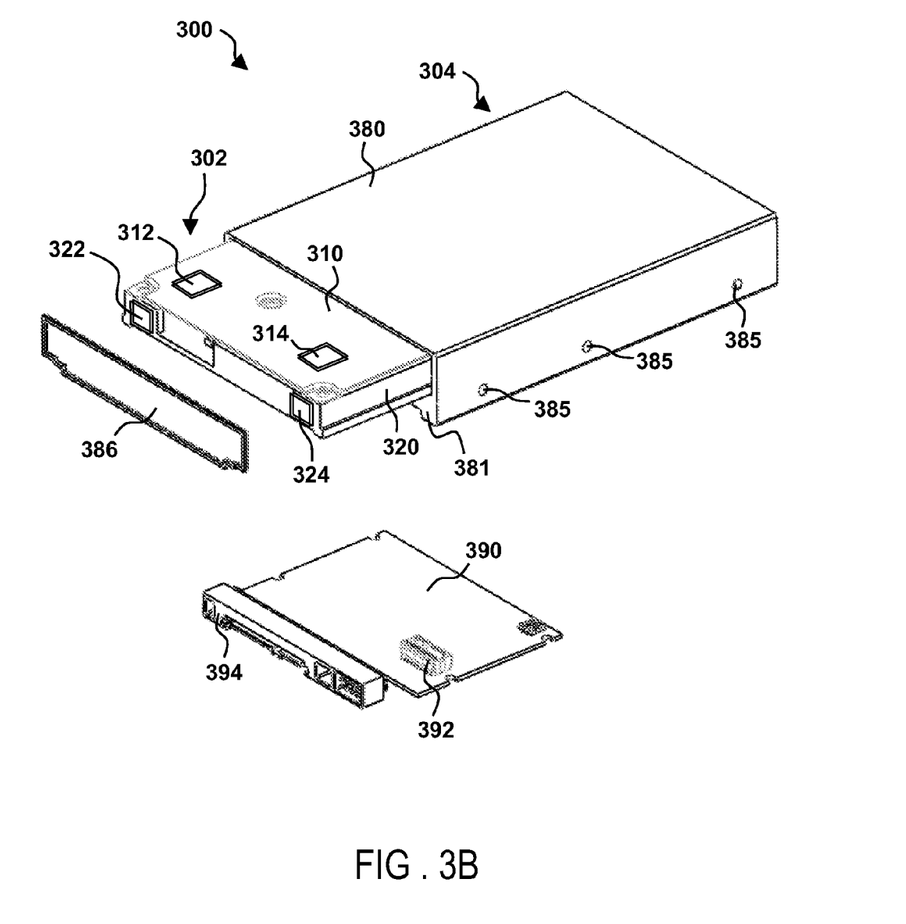
FIG. 3B is a partially-assembled perspective view of the disk drive of FIG. 3A, according to an embodiment of the present invention.

FIG. 3B is a partially-assembled perspective view of the disk drive 300 of FIG. 3A, according to an embodiment of the present invention. In the interest of brevity, numerical labels in FIG. 3B that are the same as corresponding numerical labels in FIG. 3A are not re-explained, the corresponding label descriptions for FIG. 3A being applicable to FIG. 3B.

Now referring to FIGS. 3A and 3B, during assembly of the disk drive 300, the inner frame 302 is slid lengthwise through a first end opening 376 of the outer enclosure 304 until the inner frame 302 is inside the outer enclosure 304. Specifically, FIG. 3B depicts a moment during assembly when the inner frame 302 has been slid lengthwise into the first end opening 376 yet only part way into the outer enclosure 304. Still, the outer enclosure 304 is seen in FIG. 3B to surround the disk drive base 320 and surround the disk drive cover 310, while the disk drive base 320 and the disk drive cover 310 are not part of the outer enclosure 304. In the context of FIGS. 3A and 3B, being slid lengthwise means being slid in a direction parallel to the length L of the longest side of the inner frame 302 (e.g. a direction parallel to the direction 218 shown in FIG. 2).

Now referring again to the embodiment of FIGS. 3A and 3B, after the inner frame 302 has been slid lengthwise all the way into the outer enclosure 304 via the first end opening 376, further steps may be taken to hermetically seal the outer enclosure 304. For example, sliding the inner frame 302 lengthwise through the first end opening 376 of the outer enclosure 304 may itself at least partially seal the first end opening 376 of the outer enclosure 304, so that completely sealing the first end opening 376 of the outer enclosure 304 may then require only sealing the end interface or seam remaining between the inner frame 302 and the outer enclosure 304 at the first end opening 376 (e.g. with conventional adhesive, solder, tape, and/or metal or non-metal gasket material). Alternatively or in addition, a first end cap 386 may be hermetically sealed over the first end opening 376, for example by conventional welding, adhesive, soldering, fasteners clamping a gasket, or other conventional means. Hermetically sealing the outer enclosure 304 can also include hermetically sealing a second end cap 388 over a second end opening 378 of the outer enclosure 304.

In certain embodiments, designing the inner frame 302 and the outer enclosure 304 for lengthwise assembly, as described above, may advantageously facilitate or improve sealing of the outer enclosure 304. For example, lengthwise assembly allows the first end opening 376 to be smaller than would be necessary for an opening that would permit top down assembly. Hence the periphery of the first end cap 386 may be significantly smaller than would be the periphery of a conventional top opening, so that the peripheral seam to be sealed may be advantageously less lengthy (potentially reducing total leakage rates, and the amount of sealing material needed—e.g. tape or adhesive bead length). Moreover, if conventional fasteners are used to attach the first end cap 386 over the first end opening 376, then either fewer fasteners may be used than would be necessary to seal a larger conventional top opening, or else the fasteners may provide a higher or more uniform gasket clamping pressure to the conventional gasket material around the smaller periphery of the first end opening 376 (than would be obtained by the same number of such fasteners around the larger periphery of a conventional top opening). Such potential advantages of lengthwise assembly may be even more considerable in embodiments where the outer enclosure 304 is to contain an alternative gas like helium, because in such embodiments leakage rates may be more important. Moreover, embodiments that contain helium are more likely to utilize a stiffer (e.g. metal) gasket material that, in turn, may require higher or more uniformly applied clamping pressure to reliably seal the outer enclosure 304.

As shown in FIG. 3B, the disk drive 300 may optionally include resilient polymeric material 312, 314, 322, and 324, disposed between the inner frame 302 and the outer enclosure 304. For example, resilient polymeric material 312, 314 may be disposed on the disk drive cover 310 for post-assembly contact with an inner surface of the extruded hollow cylinder 380, while resilient polymeric material 322, 324 may be disposed on the disk drive base 320 for post-assembly contact with an inner surface of the first outer end cap 386. Such resilient polymeric material may advantageously attenuate mechanical shocks and vibration.

Figure 4:
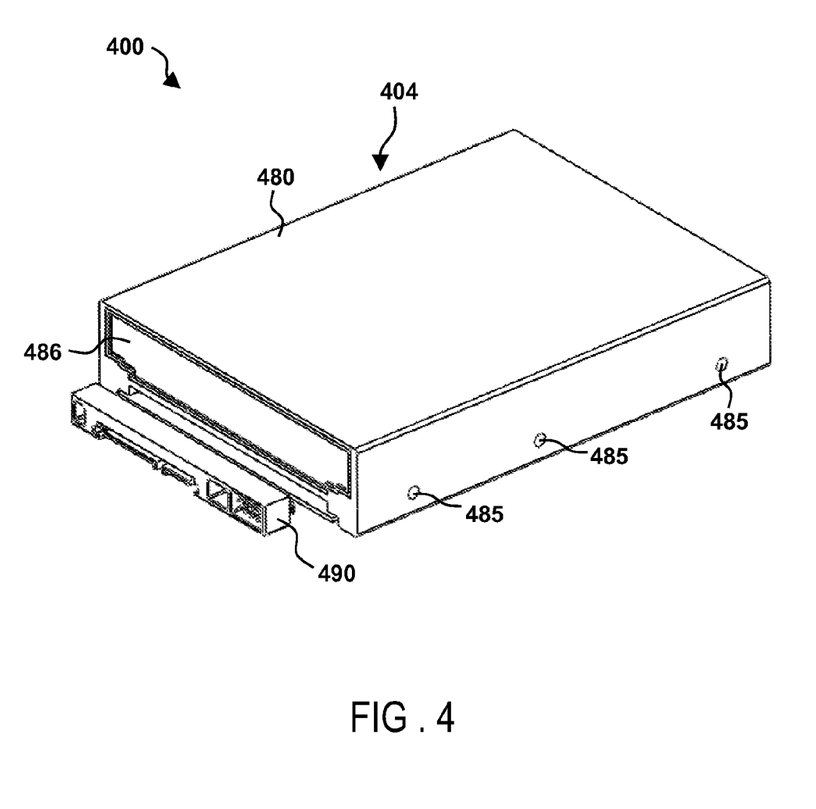
FIG. 4 is an assembled perspective view of a disk drive according to an embodiment of the present invention.

FIG. 4 is an assembled perspective view of a disk drive 400 according to an embodiment of the present invention. The disk drive 400 includes an outer enclosure 404 that includes an extruded hollow cylinder 480 that is a single monolithic component having material continuity rather than being an assembly of sub-components. The disk drive 400 further comprises a disk drive printed circuit board 490 mounted on an outside surface (bottom surface as viewed in FIG. 4) of the outer enclosure 404. Also in the embodiment of FIG. 4, the outer enclosure 404 may include a plurality of blind threaded holes 485 for mounting the disk drive 400 into a host personal computer system.

In the embodiment of FIG. 4, the outer enclosure 404 is preferably of an industry standard size, also known as an industry standard "form factor" (e.g. the "2.5 inch" form factor, the "3.5 inch" form factor, etc). Hence, the previously described enclosed inner frame that comprises the disk drive base and the disk drive cover (to which the head actuator is attached) is preferably smaller than the industry standard form factor that corresponds to the outer enclosure 404.

FIG. 4 depicts a face 486 that helps seal a first end opening of the outer enclosure 404. In certain embodiments, the face 486 may be a surface of an end cap (like end cap 386 of FIG. 3B). In certain alternative embodiments, the face 486 may be a surface of an inner frame (like inner frame 302 of FIG. 3B). Either way, an end interface between the face 486 and the outer enclosure 404 (around the periphery of the face 486) is preferably hermetically sealed by welding, solder, adhesive, and/or a conventional metal or non-metal gasket material.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
   an inner frame that comprises a disk drive base and a disk drive cover;
   a rotary spindle attached to the disk drive base;
   a disk mounted on the rotary spindle, the disk defining a disk outer periphery that protrudes into a first side opening of the inner frame;
   a head actuator that is attached to the disk drive base and to the disk drive cover; and
   an outer enclosure that includes
      an extruded hollow cylinder that is a single monolithic component having material continuity rather than being an assembly of sub-components, the extruded hollow cylinder having a cross-sectional shape that is a continuous and unbroken ring that is substantially rectangular, the extruded hollow cylinder surrounding a cavity; and
   wherein the outer enclosure surrounds the disk drive base and surrounds the disk drive cover, and wherein the disk drive base and the disk drive cover are not part of the outer enclosure.

2. The disk drive of claim 1 wherein the outer enclosure further comprises a first outer end cap attached to and hermetically sealed to a first end of the extruded hollow cylinder.

3. The disk drive of claim 2 wherein the outer enclosure further comprises a second outer end cap attached to and hermetically sealed to a second end of the extruded hollow cylinder.

4. The disk drive of claim 2 wherein the head actuator protrudes into a first end opening of the inner frame.

5. The disk drive of claim 1 wherein the disk outer periphery also protrudes into a second side opening of the inner frame.

6. The disk drive of claim 1 wherein the cavity includes helium gas.

7. The disk drive of claim 1 further comprising a disk drive printed circuit board mounted on an outside surface of the outer enclosure, the disk drive printed circuit board including an electrical connector that passes through the outer enclosure.

8. The disk drive of claim 1 further comprising a resilient polymeric material disposed between the inner frame and the outer enclosure.

9. The disk drive of claim 1 wherein the outer enclosure comprises aluminum.

10. The disk drive of claim 1 wherein the outer enclosure includes a plurality of blind threaded holes for mounting the disk drive into a personal computer system.

11. The disk drive of claim 1 wherein the rotary spindle is attached to the disk drive base and to the disk drive cover.

12. A method to assemble a disk drive comprising:
attaching a rotary spindle attached to a disk drive base;
mounting a disk on the rotary spindle;
attaching a head actuator to the disk drive base;
attaching a disk drive cover to the disk drive base to create an inner frame around the rotary spindle, the disk, and the head actuator, wherein the inner frame defines an inner frame height that is less than an inner frame width that is less than an inner frame length;
sliding the inner frame lengthwise through a first end opening of an outer enclosure until the inner frame is inside the outer enclosure;
introducing helium gas into the outer enclosure; and
hermetically sealing the outer enclosure.

13. The method of claim 12 wherein the outer enclosure is an extruded hollow cylindrical outer enclosure that is a single monolithic component having material continuity rather than being an assembly of sub-components.

14. The method of claim 12 wherein hermetically sealing the outer enclosure includes sliding the inner frame lengthwise through the first end opening of the outer enclosure.

15. The method of claim 12 wherein hermetically sealing the outer enclosure includes hermetically sealing a first end cap to the outer enclosure over the first end opening.

16. The method of claim 14 wherein hermetically sealing the outer enclosure includes sealing an end interface between the inner frame and the outer enclosure at the first end opening.

17. A method to assemble a disk drive comprising:
attaching a rotary spindle attached to a disk drive base;
mounting a disk on the rotary spindle;
attaching a head actuator to the disk drive base;
attaching a disk drive cover to the disk drive base to create an inner frame around the rotary spindle, the disk, and the head actuator, wherein the inner frame defines an inner frame height that is less than an inner frame width that is less than an inner frame length;
sliding the inner frame lengthwise through a first end opening of an outer enclosure until the inner frame is inside the outer enclosure; and
hermetically sealing the outer enclosure, wherein hermetically sealing the outer enclosure includes hermetically sealing a connector opening in the outer enclosure including inserting an impermeable electrical connector therethrough.

18. A method to assemble a disk drive comprising:
attaching a rotary spindle attached to a disk drive base;
mounting a disk on the rotary spindle;
attaching a head actuator to the disk drive base;
attaching a disk drive cover to the disk drive base to create an inner frame around the rotary spindle, the disk, and the head actuator, wherein the inner frame defines an inner frame height that is less than an inner frame width that is less than an inner frame length;
adding a resilient polymeric material between the inner frame and an outer enclosure;
sliding the inner frame lengthwise through a first end opening of the outer enclosure until the inner frame is inside the outer enclosure; and
hermetically sealing the outer enclosure.

19. A method to assemble a disk drive comprising:
attaching a rotary spindle attached to a disk drive base;
mounting a disk on the rotary spindle;
attaching a head actuator to the disk drive base;
attaching a disk drive cover to the disk drive base to create an inner frame around the rotary spindle, the disk, and the head actuator, wherein the inner frame defines an inner frame height that is less than an inner frame width that is less than an inner frame length;
sliding the inner frame lengthwise through a first end opening of an outer enclosure until the inner frame is inside the outer enclosure; and
hermetically sealing the outer enclosure, wherein hermetically sealing the outer enclosure includes hermetically sealing a first end cap to the outer enclosure over the first end opening, and hermetically sealing a second end cap to the outer enclosure over a second end opening of the outer enclosure.

* * * * *